Sept. 17, 1968     A. R. WILLIAMS ET AL     3,401,985
VEHICLE BRAKE CONTROL
Filed Jan. 24, 1967     2 Sheets-Sheet 1
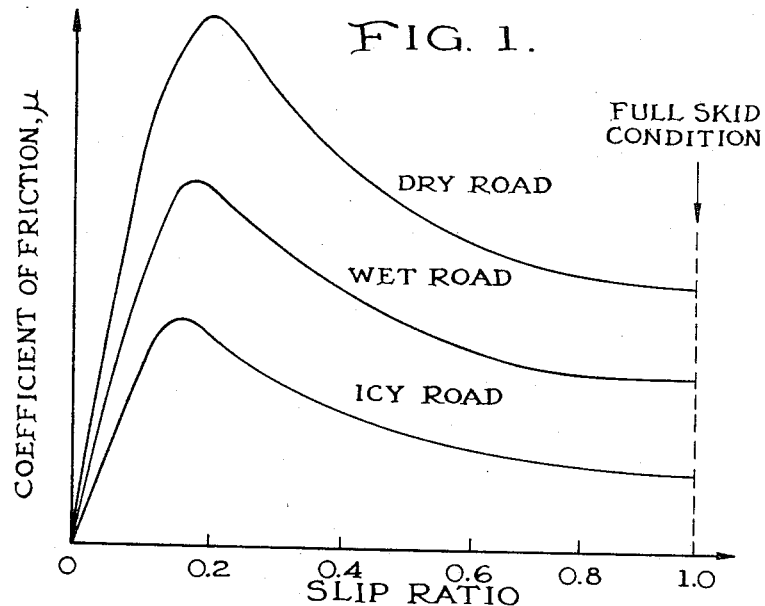
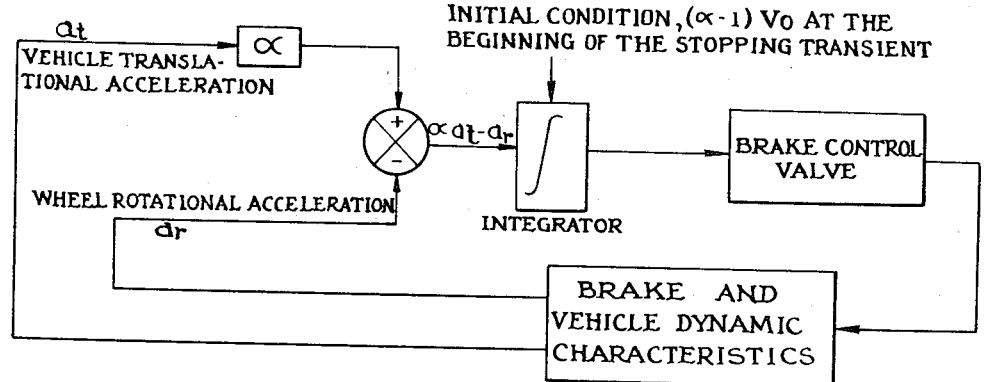
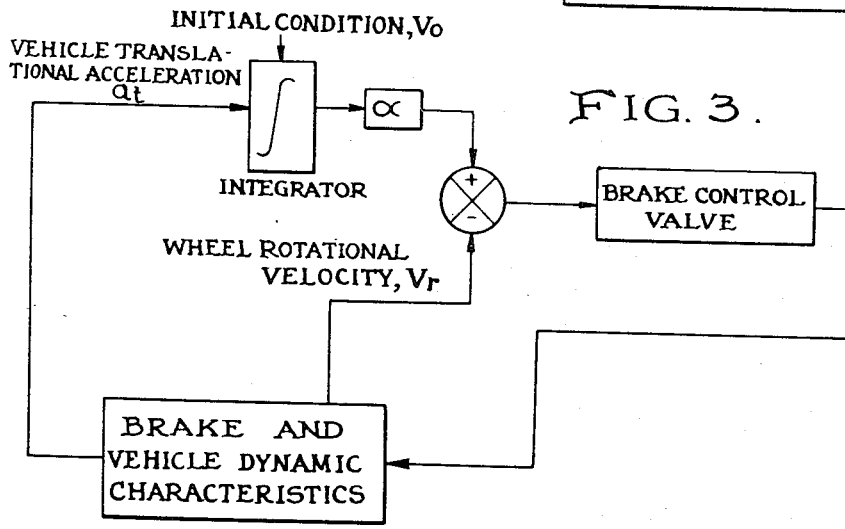

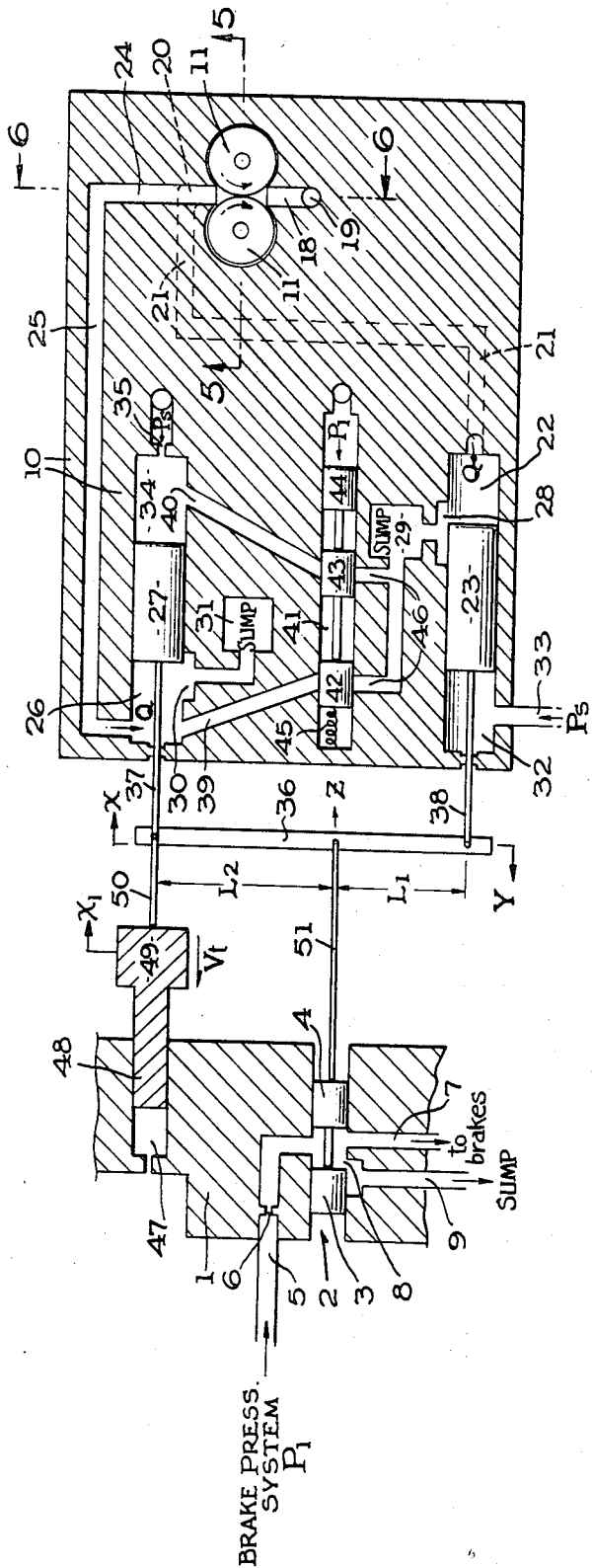
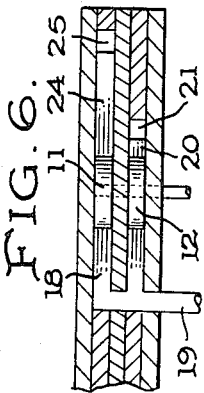

United States Patent Office  3,401,985
Patented Sept. 17, 1968

3,401,985
VEHICLE BRAKE CONTROL
Allison R. Williams, deceased, late of Vicksburg, Miss., by Henriette Le Corre Williams, Elizabeth Williams Bullard, and Ann Williams Flowers, executors, Vicksburg, Miss., and John S. Howland and Herbert H. Richardson, Framingham, Mass., assignors to Henriette L. Williams, Elizabeth W. Bullard, and Ann W. Flowers, executors of the last will and testament of Allison R. Williams, deceased
Filed Jan. 24, 1967, Ser. No. 611,480
5 Claims. (Cl. 303—21)

ABSTRACT OF THE DISCLOSURE

Control of applied fluid braking pressure during braked vehicle deceleration according to the value of the slip ratio $$\frac{V_t - V_r}{V_t}$$

where $V_t$ is the vehicle translational velocity and $V_r$ is the wheel rotational velocity.

---

This invention relates to control of the braking process that occurs on application of the wheel brakes of a moving vehicle, so as to maintain optimum braking conditions between the wheel and the vehicle supporting surface during the stopping transient, i.e., that period of changing conditions during which the vehicle decelerates and comes to a stop.

Heretofore, various brake control systems have been devised with the general objective of relieving the brake pressure in case of undue slippage between the wheel and the supporting surface, so as to reduce wear and tear on the wheel surface (often a rubber tire tread) and to minimize the hazards of skidding, which often has disastrous consequences.

For example, U.S. Patent No. 2,529,985, granted Nov. 14, 1950, to Allison R. Williams disclosed a control system in which two accelerometers, responsive respectively and independently to linear and angular wheel accelerations (i.e., negative accelerations or decelerations), produced equal and opposite counteracting signals as long as true rolling contact was maintained between the wheel and its supporting surface. In the case of slippage on the application of the brakes, however, the angular acceleration signal predominated and a significant difference between the two signals was used to proportionately reduce the brake pressure. In fluid pressure brake systems, this can be done conveniently by means of bleeding the fluid pressure line to the brake. Various arrangements were proposed for obtaining and comparing the two signals, both electrical and mechanical or hydromechanical.

In later related patents, such as No. 2,920,924, granted Jan. 12, 1960, to James B. Reswick and Allison R. Williams, additional provision was made for a bleed valve having enough lap that the valve did not begin to open until after a desired predetermined range of rate of change of slippage (10–15%) was reached.

While similar to such prior brake control systems in the use of a fluid pressure bleed valve, the present invention is predicated on the new concept of regulating the position of the valve according to the valve of a "slip ratio," a function which is identified hereinafter by the letter S and defined as $$S = \frac{V_t - V_r}{V_t} \tag{1}$$

where $V_t$=translational velocity of an appropriate point on the vehicle (generally the linear velocity of the vehicle at the axis of rotation of a braked wheel or at the center of gravity of the vehicle).
$V_r$=rotational velocity of a braked wheel in contact with its supporting surface, defined as the product of angular velocity of the wheel, $\omega$, and the effective radius of the wheel, $r$; it is implied here that the wheel actually makes a "footprint" on its supporting surface.

This new method of brake control has very important advantages over the prior art briefly set forth above, which can be explained more clearly by reference to the accompanying drawings in which FIG. 1 shows typical variations in the coefficient of friction between the wheel tread and its supporting surface when plotted against slip ratio S;

FIGS. 2 and 3 are schematic illustrations of the principal components of control systems based on the slip ratio method;

FIG. 4 illustrates schematically in section one form of hydromechanical control system based on the slip ratio method and embodying the invention; and FIGS. 5 and 6 are sectional details on the lines 5—5 and 6—6 of FIG. 4.

As disclosed in prior patents, it appears that the coefficient of friction between a rubber vehicle tire and its supporting surface reaches a maximum value at a certain degree of slippage (depending to some extent on operating conditions). It can be seen that this maximum determines the optimum value of the slip ratio S in any given case.

It has now been determined, as shown by the typical curves in FIG. 1, that this optimum value of S is approximately the same widely differing road conditions, as shown by a comparison of the points on the horizontal axis at which the peaks of the curves occur. In other words, the optimum value of S for such varying conditions is approximately constant, and slip ratio can be set equal to a constant $k$ for optimum results:

$$\frac{V_t - V_r}{V_t} = k$$

or $$V_t(1-k) - V_r = 0 \tag{2}$$

Under the typical conditions illustrated by FIG. 1, the value of $k$ should be in the range of $0 < k < 0.2$ and preferably close to but not exceeding a value corresponding to the peak value of the coefficient of friction for the average condition.

It is assumed that $V_t = V_r$ at the instant of application of the brakes, and it will be seen that a control system which enforces Equation 2 thereafter, as rapidly as possible consistent with the control dynamics, with proper regard to the initial conditions ($V_{to}$ and $V_{ro}$) existing when the system is activated, will produce an optimum stopping transient. There are two general schemes for implementing such a control system:

(a) *Integrated acceleration difference*

This system is shown schematically in FIG. 2. In this system, accelerometers are used to sense the vehicle translational acceleration and wheel rotational acceleration. A proportioned difference between these accelerations is taken, the result is integrated taking into account the initial condition when the system is activated, and the resulting proportioned velocity difference is used to control the brake pressure. If $V_r$ is too high, the brake pressure is proportionately increased and if $V_r$ is too low, the brake pressure is proportionately reduced. Thus, the control system will tend to bring about the condition expressed by Equation 2 in the form, $$\int(\alpha \dot{V}_t - \dot{V}_r)dt + (\alpha - 1)V_o = 0 \quad (3)$$

where $\alpha$ is a constant equal to $(1-k)$ and the initial velocity $V_o \equiv V_{to} = V_{ro}$. The acceleration signals, summing operation, and integration may be in any medium (i.e., mechanical, hydraulic, electrical, etc.).

(b) Integrated vehicle acceleration system

Another general scheme which is preferred for most purposes is shown schematically in FIG. 3. This system uses an accelerometer to measure the translational vehicle acceleration. This signal is integrated with suitable attention to the initial condition and multiplied by the constant $\alpha$. The wheel rotational velocity signal, which is directly measured with a tachometer or the like, is then subtracted from the modified vehicle translational velocity signal and the resulting signal used to control the brake pressure.

In equation form, this control system tends to bring about the condition, $$\alpha[\int \dot{V}_t dt + V_{to}] - V_r = 0 \quad (4)$$

Again, the operations may be accomplished in any medium.

The present invention relates to a control system based on Equation 4 and utilizing positive displacement pump means, driven at a speed proportional to that of the vehicle wheel, to provide a liquid flow rate proportional to wheel rotational velocity $V_r$. This liquid flow is used to produce piston displacements proportional to $V_r$ and $V_{to}$ according to the well-known relationship $$A = Q\sqrt{\rho/2P_s}$$

where $A$ = area of opening of ports 30 (initially) and 28.
$Q$ = volumetric flow rate from pump.
$P$ = fluid mass density.
$P_s$ = pressure.

The system shown schematically in FIG. 4 is an example of such hydromechanical implementation of the integrated vehicle acceleration scheme of Equation 4. A displacement proportional to $V_{to}$ is produced by a piston or like element moving in response to the liquid flow rate proportional to the rotational velocity of the wheel, during the time that the vehicle is in motion with the wheel in contact with a supporting surface but without application of the brake (under these conditions $V_r$ equals $V_t$). Likewise, a second displacement proportional to the wheel rotational velocity is produced by a second piston or like element which also moves in response to a liquid flow rate proportional to wheel rotational velocity. These two piston displacements are then subtracted mechanically by suitable mechanical differencing or subtracting means. Various types of mechanisms are known for accomplishing algebraic summation as required by the above equations. For example, linkages are known whereby two linear inputs are summed in a linear output; the same type of summation can be performed by a rack and gear arrangement. Still another arrangement is to provide two parts each movable in accordance with one of the proportional displacements and both parts moving together as long as these displacements are equal. In the latter case, any difference between the two displacements will result in one part moving relative to the other, which relative movement can be utilized to operate the brake pressure control valve.

FIG. 4 shows a floating lever for performing this subtraction, the pistons being connected to opposite ends of the lever and arranged to move the ends in opposite directions. Thus, the values of $V_{to}$ and $V_{ro}$ will already have been introduced into the system at the instant of brake application, by the setting of the floating lever.

At the instant of application of the brake, the piston which previously introduced the value of $V_{to}$ at one end of the lever is rendered ineffective by disconnection or otherwise, and is replaced by a suitable mechanical integrating means which comes into action in response to vehicle translational acceleration to supplement the setting $V_{to}$. Meanwhile, the other piston continues to impart the value of $V_r$ to the other end of the floating lever so as to perform mechanically the subtraction called for by Equation 4 during the braking transient. An intermediate point on the floating lever is connected with a suitable metering valve, which controls the bleeding of the fluid pressure supply to the brake.

Either one or both of two ways can be used to introduce the factor $\alpha$ into the mechanical summation which in the present example is performed by the floating lever. One of these ways is described below. For the present, it will be understood that the lever arms can be properly proportioned so as to introduce the factor $\alpha$, so that the position of the metering valve is controlled according to Equation 4. At the instant of brake application, when slip ratio is zero, this metering valve will normally be closed, or nearly closed, so that the value of the slip ratio increases rapidly to the desired optimum (say 0.2). When this point is reached Equation 4 is satisfied. The metering valve is moved so that the optimum value of the slip ratio is thereafter maintained.

It will be understood that any desired type of metering pressure control valve can be employed, various types of both single-stage and two-stage valves being known in the art. FIG. 4 shows diagrammatically a valve body 1 provided with a bore 2 in which a valve spool having two metering lands 3 and 4 is slidable. The fluid pressure brake system includes a channel 5 and orifice 6 therein leading to the space in the bore 2 between the metering lands 3 and 4. From this space another passage 7 leads to the brakes, and in the position of the metering lands shown in FIG. 4, part of the pressurized fluid also bleeds off through a port 8 that is partly uncovered by the land 3 and a passage 9 leading to a suitable non-pressurized reservoir or sump ($P=0$).

The position of the valve spool is regulated by a control unit comprising a body 10 having pumps 11 and 12 of the positive displacement type, such as gear pumps, which are both driven by any suitable means (not shown) at a speed that is proportional to the rotational speed of the wheel $V_r$. Each of the pumps 11 and 12 therefore produces a flow rate, $Q$, which is proportional to the rotational speed $V_r$ of the wheel.

By way of example, the body 10 of the control unit, at least in the region of the pumps 11 and 12, may suitably comprise a laminated arrangement of plates, the intermediate plates being cut out to provide the requisite gear housings and fluid passages which are closed by cover plates on both sides. Thus the plate 13 is cut out to form a housing for the pump gears 11 and the plate 14 is cut out to form a housing for the pump gears 12, these housings being completed and closed by the two outer plates 15 and the middle plate 16 of the stock. Preferably, the gears 11 and the gears 12 are located directly above and below one another, so that one gear of each pair can be driven at wheel speed by a common shaft 17.

The pump 11 withdraws fluid from the sump through passages 18 and 19 and its output flows through passages 20 and 21 to a chamber 22 in one end of a bore in which a piston 23 is slidable. Similarly, the pump 12 withdraws fluid from the sump through passages 18 and 19 and its output flows through passages 24 and 25 to a chamber 26 in one end of a bore in which a piston 27 is slidable. Fluid from chamber 22 exhausts through a port 28 to the sump indicated at 29, and fluid exhausts from chamber 26 through a port 30 to the sump indicated at 31. The chamber 32 at the other end of the bore in which piston 23 slides is supplied with a constant supply pressure $P_s$ through inlet passage 33, as is also the chamber 34 at the other end of the bore in which piston 27 slides through an orifice 35.

As thus far described, assuming the vehicle to be in motion with the wheel in contact with the supporting surface but without application of the brakes, each of the pistons 23 and 27 will assume a position that reflects the rotational speed of the wheel $V_r$. This follows because the areas of the ports 28 and 30, respectively, that are uncovered by the pistons 23 and 27, respectively, must satisfy the well-known orifice relationship stated above, i.e., $A = Q\sqrt{\rho/2P_s}$.

Since $\rho$ and $P_s$ are constants and Q is proportional to $V_r$, which equals $V_{t0}$ at the instant of application of the brakes, and since A in both cases (assuming the same peripheral width) is proportional to piston displacement, it follows that the displacement X of piston 27 and the displacement Y of piston 23 are proportional to $V_r$ or $V_t$. If desired, the peripheral widths of the ports 28 and 30 can be proportioned so as to introduce the factor $\alpha$.

The piston displacements X and Y are subtracted by any suitable mechanical summing means here shown by way of example as a floating lever 36, as by means of the connections shown diagrammatically at 37 and 38. It will be seen that since the flow chambers 22 and 26 are at opposite ends of their respective pistons 23 and 27, the displacement X takes place to the right whereas the displacement Y takes place to the left. Thus, the upper end of the floating lever, as seen in FIG. 4, is moved to the right through a distance X which is proportional to $V_t$, and the lower end of the lever as seen in FIG. 4, is moved to the left through a distance Y which is proportional to $V_r$. This arrangement takes into account the negative sign of $V_r$ in Equation 4.

As stated above, when the brake is applied, the piston 27 must be rendered ineffective to adjust the floating lever and must be replaced by an integrating means responsive to $\dot{V}_t$. To this end, the chambers 26 and 34 are provided with drain passages 39 and 40, respectively, leading to another bore 41 where they are normally closed off by lands 42 and 43 of a slidable valve spool movable by means of a piston 44 against a spring 45. When the brake is applied, the brake system pressure $P_1$ is also applied to the piston 44 so as to move the lands 42 and 43 to the left in the bore 41; now fluid from the drain passages 39 and 40 passes through the bore 41 into passages 46 leading to the sump 29. The piston 27 is then ineffective except that its mass may act to some extent as an accelerometer responsive to vehicle translational acceleration and its friction in the bore as a damping means responsive to the piston velocity. However, it is preferred, in general, to provide a dashpot 47 having a slidable plunger 48 and a seismic mass 49 to perform the vehicle translational acceleration integration function. The vehicle deceleration, $\dot{V}_t$ shown in FIG. 4 will then tend to move the mass 49 to the right relative to the control unit, as shown at $X_1$. The dashpot 47 then has the effect of integrating $\dot{V}_t$ with respect to time to produce a displacement of mass 49 which is proportional to the linear velocity of the vehicle. This displacement is introduced at the lever by the link 50 and is added to the initial displacement $X_0$ of piston 27 which corresponds to the initial linear velocity of the vehicle.

The pressure control valve 3, 4 and its operating member 51 are connected to the mechanical summing device, in the example shown, the lever 36 with its lever arms proportioned to provide the ratio $\alpha = 1-k$. Referring to FIG. 4 and using known relationships, $$Z = \frac{L_1 X - L_2 Y}{L_1 + L_2} \quad (5)$$

where Z is the movement of the lever 36 at the intermediate point where the member 51 is connected, or in other words, the displacement of the bleed valve. This relationship can be written $$\frac{(L_1+L_2)}{L_2} Z = \frac{L_1}{L_2} X - Y \quad (6)$$

In this equation X (i.e., the summation of displacements $X_0$ and $X_1$) corresponds to the bracketed term of Equation 4 and Y to its negative term $V_r$. By proportioning the arms $L_1$ and $L_2$ so that the ratio $$\frac{L_1}{L_2} = 1 - k$$

(in this example 1.00/1.25 or 0.8), and substituting for X and Y, Equation 6 becomes $$\left(\frac{2.25}{1.25}\right) Z = 0.8[\int \dot{V} dt. + V_{t0}] - V_r$$

It should be understood that the optimum value of slip ratio that is to be maintained can vary somewhat depending upon conditions encountered in practice, both as to the supporting surfaces and the vehicle itself. In FIG. 1, the optimum or peak values under different road conditions are only approximately the same so that, to a certain extent, it is necessary to use an average value that should be close to but preferably not in excess of any of the peak values that may be encountered in service. Also, the curves shown in FIG. 1, while typical, do not necessarily apply to all vehicles, even assuming the same supporting surface. Thus, minor variations in the optimum value of S (or $k$) may occur in different cases. One of the important advantages of the systems described above is that such variations can be taken into account by adjustment of the potentiometer settings, i.e., by "tuning" each system for the particular vehicle on which it is installed and for the average road conditions to be encountered.

It will be evident to those skilled in the art that a system embodying the invention can be used in various ways. For example, a single control system at any given wheel, in which a single vehicle translational velocity is compared with a single rotational velocity of the specific wheel, can be used if desired to control the brake pressure in the wheel cylinders of a group of braked wheels. Such a single system may be sufficient on vehicles having an all-wheel drive or transmission that prevents the wheels from locking or spinning independently, or such a drive or transmission for part but not all of the wheels (usually the rear wheels).

On the other hand, it may be preferable to employ separate control systems at each braked wheel so as to determine independently the slip ratios existing at each wheel. In such cases, the brake pressure can be independently controlled at each braked wheel, on the basis of the particular proportioned velocity difference at each wheel; or a brake pressure common to all braked wheels could be controlled on the basis of an averaged effect of the various proportioned velocity differences at several wheels. Otherwise, the rotational velocity of each braked wheel could be measured and the average then compared with the translational velocity of the vehicle as a whole measured by integrating the translational acceleration of any desired particular point on the vehicle.

What is claimed is:
1. Means for controlling the fluid pressure in a pressure-operated braking system of a wheeled vehicle so as to maintain, during a braking transient, an approximately constant optimum value of the slip ratio

$$\frac{V_t - V_r}{V_t}$$

between a wheel and its supporting surface, where $V_t$ is the vehicle translational velocity and $V_r$ is the wheel rotational velocity, said means including a brake pressure control valve openable to reduce the brake pressure in said system by creating a bleed flow through said valve, and means for opening said valve when said slip ratio deviates in either direction from said optimum value comprising positive displacement pump means driven at a speed proportional to and providing a fluid flow at a rate proportional to the wheel rotational velocity, two devices displaceable in response to said fluid flow and proportionally to said flow rate prior to the beginning of a breaking transient, mechanical summing means for algebraically summing the displacements of said devices, and mechanical accelerometer and integrator means imparting an additional displacement to said summing means in response to vehicle acceleration during a braking transient, the summation of said displacement by said summing means being transmitted to said valve.

2. Brake control means as defined in claim 1, said mechanical differencing means comprising a summing lever having an intermediate point connected to said valve and its ends movable proportionally to said displacements but in opposite directions.

3. Control means as defined in claim 2, said optimum value being less than unity and the lever arms between said intermediate point and the respective ends of said lever having a ratio corresponding to the difference between said optimum value and unity.

4. Control means as defined in claim 1, at least one of said devices displaceable proportionally to said flow rate comprising orifice means and a piston valve member having one end movable relative to said orifice means to provide a variable orifice opening, said pump means providing an output flow rate to said orifice opening proportional to the wheel rotational velocity, means subjecting the other end of said piston to substantially constant supply pressure, said piston valve member adjusting its position relative to said orifice means in accordance with variations in said flow rate.

5. Control means as defined in claim 4, said one device being that device the displacement of which corresponds to vehicle translational velocity, together with means operable on brake application for relieving said piston valve member of fluid pressure at the beginning of a braking transient.

References Cited

UNITED STATES PATENTS

| | | | |
|---|---|---|---|
| 3,014,764 | 12/1961 | Heckendorf | 303—21 |
| 3,022,114 | 2/1962 | Sampietro | 303—21 |
| 3,292,977 | 12/1966 | Williams | 303—21 |

DUANE A. REGER, *Primary Examiner.*